Aug. 8, 1961    L. J. LAPOINTE    2,995,636
VOLTAGE DISCRIMINATING DEVICES
Filed March 20, 1958

INVENTOR
LLOYD J. LAPOINTE
BY Thomas S. Ross
Joseph R. Spalla
ATTORNEYS

United States Patent Office 2,995,636
Patented Aug. 8, 1961

2,995,636
VOLTAGE DISCRIMINATING DEVICES
Lloyd J. Lapointe, Manchester, Conn., assignor to Royal McBee Corporation, Port Chester, N.Y., a corporation of New York
Filed Mar. 20, 1958, Ser. No. 722,742
1 Claim. (Cl. 200—87)

This invention relates to voltage discriminating devices; more particularly it relates to an electromechanical voltage discriminating device having a movable circuit controlling element whose position is determined by the flux conditions in a magnetic circuit.

In many applications it is desirable to provide a device operable to effect the closure of a high voltage circuit in response to a low voltage signal of predetermined magnitude; energize a normally deenergized circuit in response to a signal of predetermined magnitude; energize a normally deenergized or deenergize a normally energized circuit in response to a signal of predetermined magnitude; or to energize a normally deenergized and deenergize a normally energized circuit in response to a control signal of predetermined magnitude.

In the present invention a switching or circuit controlling element in the form of a magnetizable ball is retained in the air gap of a magnetic circuit which comprises a reference flux generator and a signal flux generator. The reference and signal flux generators are electrically isolated from one another except through the ball. The ball normally maintains the air gap closed except when the reference and signal fluxes flowing in the magnetic circuit are equal in magnitude and opposite in direction at which time the ball is drawn into an open air gap position by the leakage field of the reference flux generator. The movement of the ball in response to signal fluxes of predetermined magnitude is utilized to break and/or make external circuits arranged as will hereinafter appear to perform as described above.

An object of the invention therefore is to provide an electromechanical voltage discriminator.

Another object of the invention is to provide an electromechanical voltage gating device.

Still another object is to provide an electromechanical monostable switching device.

A further object of the invention is the provision of an electromechanical device for controlling a plurality of circuits.

A further object is the provision of a control device responsive only to signals of predetermined magnitude.

A still further object of the invention is the provision of an electromechanical voltage discriminating relay wherein the movable element is magnetically secured to the relay.

Other objects and many of the attendant advantages of this invention will be readily appreciated as the same becomes better understood by reference to the following detailed description when considered in connection with the accompanying drawings in which like reference numerals designate like or corresponding parts throughout the figures thereof and wherein.

Figure 1:
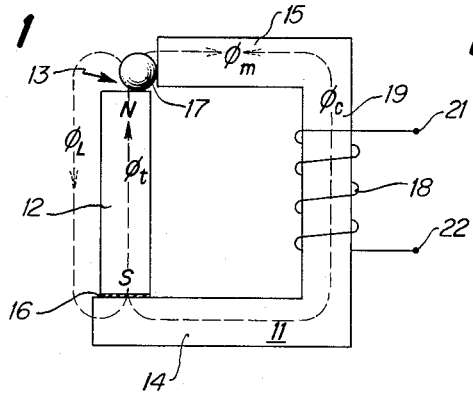
FIG. 1 is a diagrammatic view of a voltage discriminating device in accordance with the invention showing the movable element in one of its two positions.

Referring now to the drawings wherein like reference characters designate like or corresponding parts throughout the several views thereof there is shown in FIG. 1 a magnetic circuit comprising a core generally designated by reference numeral 11, a reference flux generator 12 and a working air gap 13. The core has a rectangular cross section and is made from materials, such as non-conductive "ferrites," or conductive irons or steels, having a very high permeability and a residual flux density preferably lower than the flux density of the reference flux generator 12. The rectangular core is shaped in the form of a U with one leg 14 longer than the other leg 15 by a predetermined amount. As shown in the drawing the portion of the leg 14 which extends beyond leg 15 is adapted to support the reference flux generator 12 which is either in the form of a direct current carrying coil wrapped about an iron core or preferably a permanent magnet as shown which has a rectangular cross section similar to that of the core 11. The permanent magnet flux generator 12 comprises a material of high permeability and high magnetic retentivity, such as Alnico, treated to make a magnet of a high order of stability.

When the core 11 is of non-conductive ferrite material the flux generator 12 may be secured directly to the core leg 14. Where however, the core is of a conductive material such as iron or steel, there is provided for reasons which will hereinafter be apparent, a thin blank of a suitable electrical insulating material 16 between the reference flux generator and the core leg 14. The length of the permanent magnet is such that the working air gap 13 is formed between the upper end or north pole of the magnet and the orthogonally disposed end of the leg 15 of the core.

As is understood in the art the flux $\phi_t$ which emanates from the north pole of the magnet and flows to the south pole will, because of the relatively large air gap 13 comprise a main flux $\phi_m$ which flows through the path of lowest reluctance, which path is across the working air gap 13 and through the core 11; and a leakage flux $\phi_L$ which flows between the north and south poles through an air path. A spherical ball 17 formed from a material having a high permeability and a lower residual flux density than the flux density of magnet 12 is placed within the air gap and forms a low reluctance path between magnet and core for the main flux $\phi_m$ whereby the ball assumes the position shown in FIG. 1 in point contact with the magnet and core. In accordance with the invention a coil 18 is wound around the base leg 19 of the core and the terminals 21 and 22 thereof are adapted to be connected to a signal source.

Figure 2:
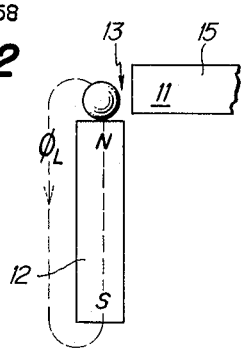
FIG. 2 is a fragmentary diagrammatic view similar to FIG. 1 showing the movable element in the other of its two positions.

In operation signals applied to the coil 18 are adapted to set up a flux $\phi_c$ in the magnetic circuit which opposes the flux $\phi_m$ set up by the permanent magnet. If $\phi_c$ is zero, less than, or greater than $\phi_m$ the resultant flux in the magnetic circuit will maintain the ball in the closed air gap position shown in FIG. 1. When the signal applied to winding 18 is of such magnitude that $\phi_m = \phi_c$ the resultant flux in the magnetic circuit will be zero or substantially zero and the ball 17 will be rapidly drawn to the center of the permanent magnet by the leakage flux field as shown in FIG. 2.

Figure 3:
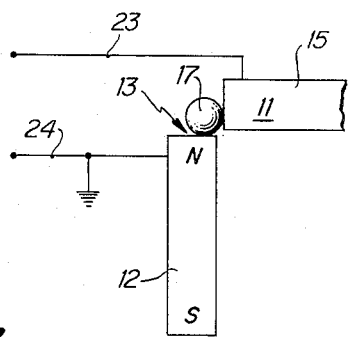
FIG. 3 is a fragmentary view showing a stationary contact arrangement adapted to cooperate with the movable element.
Figure 6:
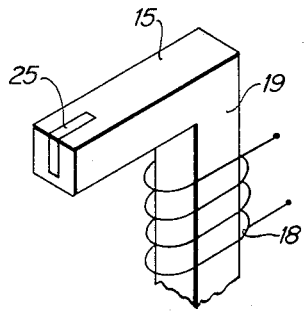
FIG. 6 is a fragmentary perspective view of an alternate core construction.

Referring now to FIG. 3 there are shown two conductors 23 and 24 suitably connected respectively to the permanent magnet and to the core. Where the core is formed of electrically conductive material the conductors may be connected to the core and magnet as by soldering thereby necessitating the employment of the insulating material 16 to prevent current flow between the core and magnet. Where a non-conductive ferrite core is employed, connection of a conductor thereto may be accomplished by plating a conductive material 25 such as copper on the ferrite core as shown in FIG. 6, which plating will electrically contact the ball when it is in a closed air gap position. As is apparent when the ball is in the closed air gap position shown in FIG. 1, the conductors 23 and 24 are electrically connected through the ball whereby a utilization circuit connected to said conductors will be closed and energized. Upon application of a signal of predetermined magnitude to winding 18 the ball will assume the open air gap position shown in FIG. 2 and said circuit will be broken and deenergized.

Figure 4:
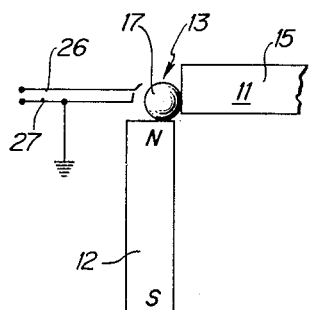
FIG. 4 is a view similar to FIG. 3 showing another contact arrangement.

In FIG. 4 circuit conductors 26 and 27 respectively are placed in the path of the ball, whereby when the ball is in a zero air gap position the utilization circuit to which the conductors are connected will be open and deenergized but when the ball moves to an open air gap position the circuit will be closed an energized.

Figure 5:
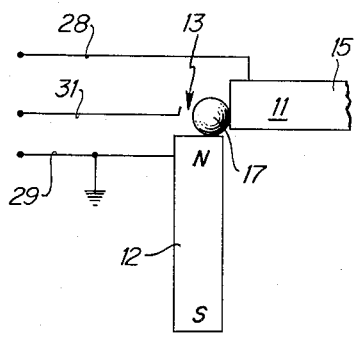
FIG. 5 is a view similar to FIG. 3 showing a further contact arrangement.

In FIG. 5 the voltage discriminator may be employed to control two circuits, one of which is normally energized and the other of which is normally deenergized by connecting conductors 28 and 29 respectively to the core and permanent magnet and another conductor 31 in the path of the ball 17. Application of a signal of predetermined magnitude will move the ball and thereby connect conductors 29 and 31 thereby reversing the normal conditions wherein conductors 28 and 29 are connected.

While the core and magnet have been described as having rectangular cross sections it is to be understood that they may take any shape, for example the core may comprise a spool with an upper and lower radially extending flange, and the magnet may comprise a hollow cylinder supported by the lower flange of the spool. In such an embodiment a plurality of balls may be disposed about the annular air gap so formed by such a construction whereby a plurality of circuits may be simultaneously controlled in response to a signal of predetermined magnitude.

It should be understood that the foregoing disclosure relates only to preferred embodiments of the invention and that it is intended to cover all changes and modifications of the examples of the invention herein chosen for the purposes of the disclosure, which do not constitute departures from the spirit and scope of the invention.

The invention claimed is:

A control device responsive to preselected voltage magnitudes comprising a series magnetic circuit having a single working air gap, said series magnetic circuit including a reference flux generator and a signal flux generator responsive to applied voltages of varying magnitude for generating signal fluxes opposite in direction to said reference flux, said air gap being defined by a pole face of said reference flux generator orthogonally disposed with respect to a pole face of said signal flux generator, a movable element normally magnetically held in contact with said pole faces when said signal flux is less than or exceeds the reference flux in said series circuit, said element assuming a position out of contact with the pole face of said signal flux generator while remaining in contact with said reference generator pole face only when the signal flux is equal in magnitude to the reference flux, and circuit means responsive to the position of said element.

References Cited in the file of this patent

UNITED STATES PATENTS

| | | |
|---|---|---|
| 684,378 | Potter | Oct. 8, 1901 |
| 1,169,475 | Finnigan | Jan. 25, 1916 |
| 1,631,025 | Flener | May 31, 1927 |
| 2,111,550 | Armstrong | Mar. 22, 1938 |
| 2,253,856 | Harrison | Aug. 26, 1941 |
| 2,419,612 | Warshaw | Apr. 29, 1947 |
| 2,511,399 | Degiers | June 13, 1950 |
| 2,546,693 | Jauss | Mar. 27, 1951 |
| 2,732,458 | Buckingham | Jan. 24, 1956 |
| 2,794,178 | Reynolds | May 28, 1957 |
| 2,833,882 | Valehrach | May 6, 1958 |